May 13, 1924.
W. E. PHILIPS
BELT CONVEYER SUPPORT
Filed July 5, 1921
1,493,765
2 Sheets-Sheet 1
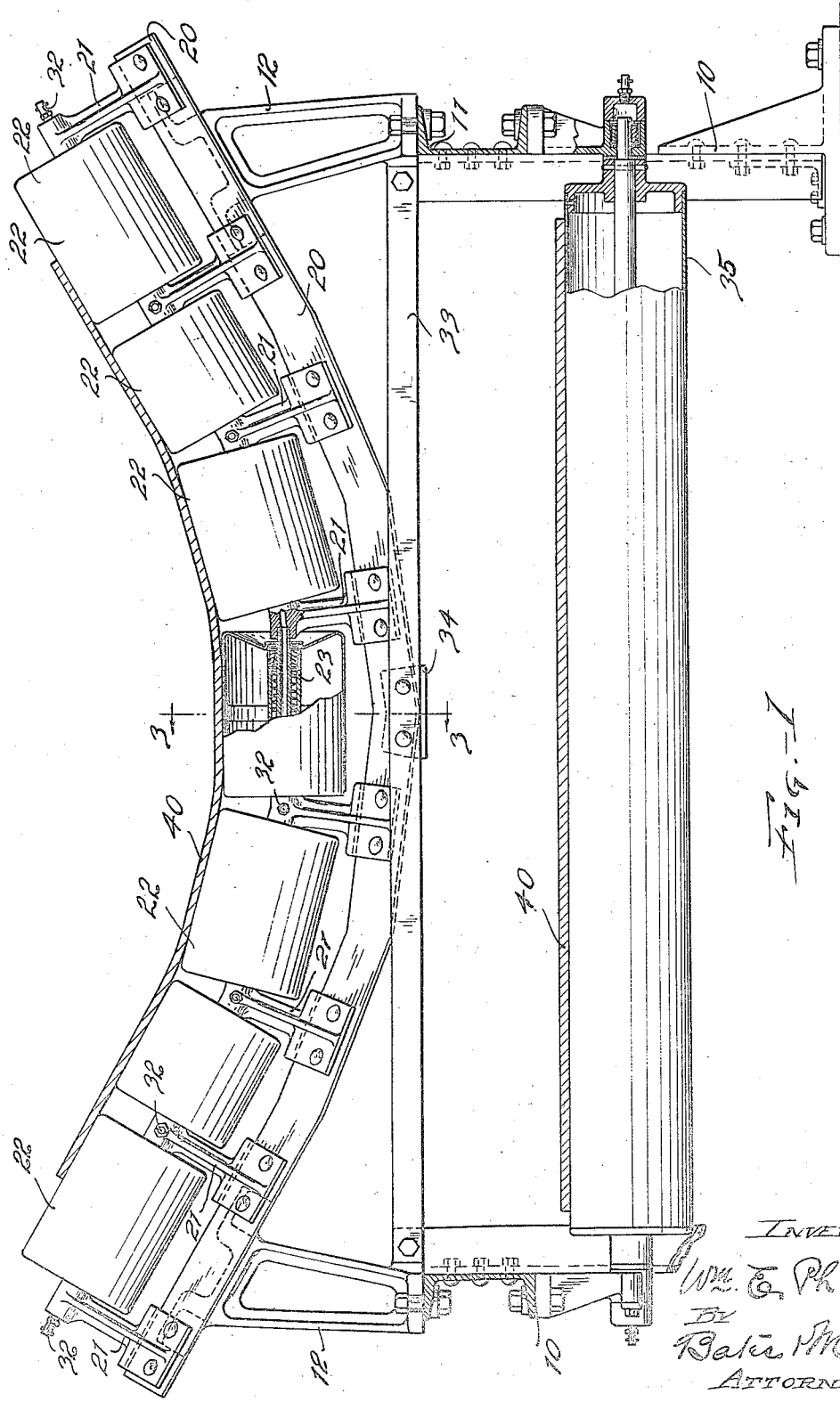

May 13, 1924.
W. E. PHILIPS
1,493,765
BELT CONVEYER SUPPORT
Filed July 5, 1921 2 Sheets-Sheet 2
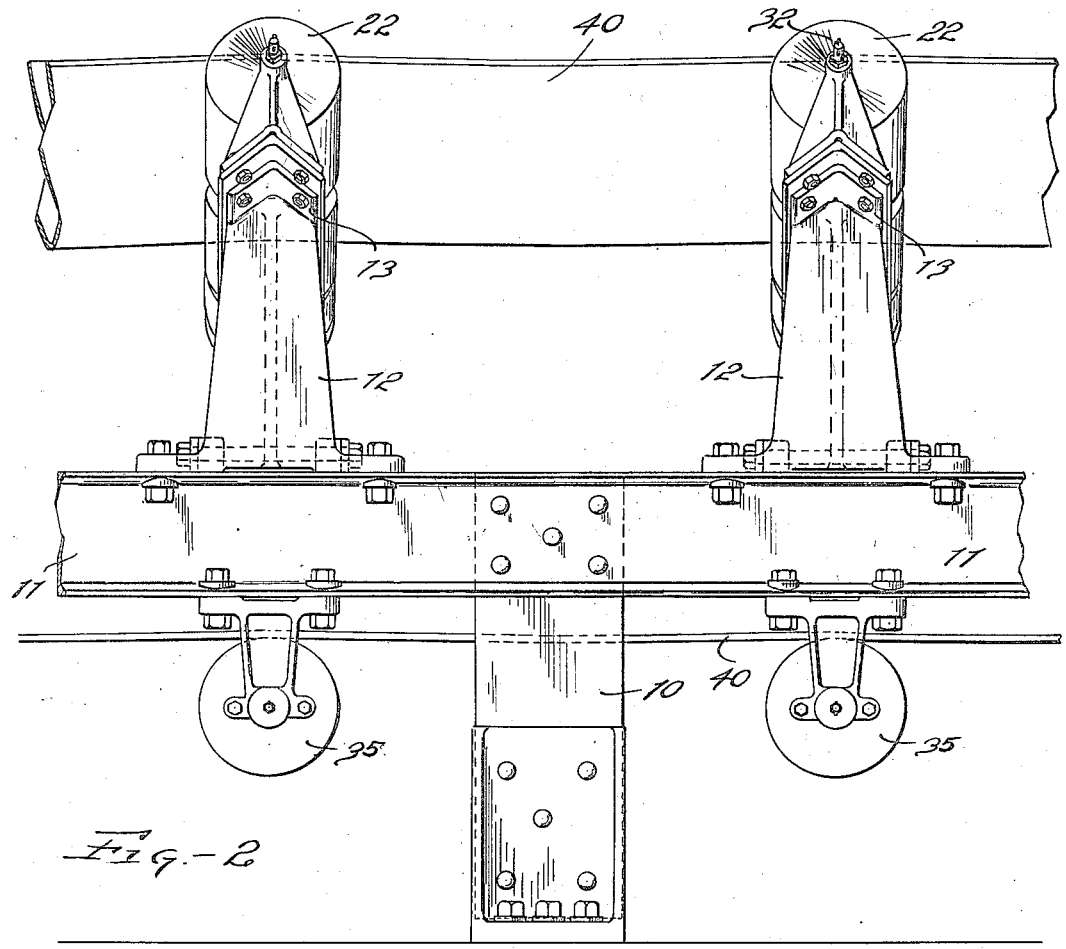
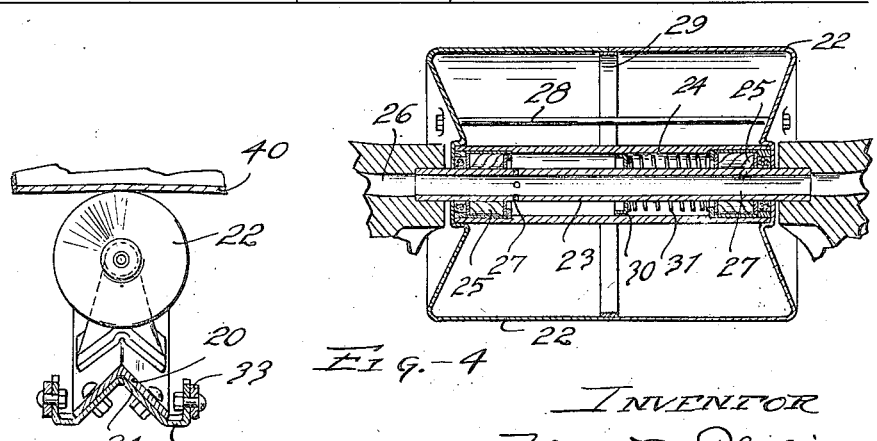

Patented May 13, 1924.

1,493,765

UNITED STATES PATENT OFFICE.

WILLIAM E. PHILIPS, OF CLEVELAND, OHIO, ASSIGNOR TO THE STEARNS CONVEYOR COMPANY, OF CLEVELAND, OHIO, A CORPORATION OF OHIO.

BELT-CONVEYER SUPPORT.

Application filed July 5, 1921. Serial No. 482,581.

*To all whom it may concern:*

Be it known that I, WILLIAM E. PHILIPS, a citizen of the United States, residing at Cleveland, in the county of Cuyahoga and State of Ohio, have invented a certain new and useful Improvement in Belt-Conveyer Supports, of which the following is a full, clear, and exact description, reference being had to the accompanying drawings.

My invention relates to a conveyer support and has for one object to provide a support having movable parts so arranged as to be properly lubricated at all times and kept free from dirt and grit.

More specifically an object of the invention is to provide a means for constantly and continuously feeding lubricant for a long period of time to the bearings of the movable parts of the support without attention from the attendant.

Another object is provision of a support so arranged as to prevent accumulation of dirt and grit adjacent the bearings.

It will be seen that by employing the continuous lubricant feed together with the arrangement for preventing the accumulation of dirt adjacent the bearings, that the bearings are kept properly lubricated and protected at all times, the inner feed continuously forcing fresh lubricant to the bearings and driving out and preventing the accumulation of any dirt.

Further objects of the invention will be apparent in the course of the following description and the features of novelty will be set forth in the claims.

In the drawings in which a device embodying the principles of my invention is illustrated, Fig. 1 is a sectional view taken transversely to the conveyer belt; Fig. 2 is a fragmentary side elevation of the device; Fig. 3 is a sectional view taken substantially along the line 3—3 of Fig. 1; Fig. 4 is a fragmentary longitudinal section on an enlarged scale through one of the belt supporting rollers and adjacent supporting means.

The construction illustrated comprises a suitable frame work for carrying the belt supporting rolls with a conveyer belt thereon. This frame work consists of sets of standards 10 arranged adjacent the sides of the belt and carrying at their upper ends beams 11 which are suitably secured thereto and extend along the run of the belt and at each side thereof. These beams are provided with upper flanges carrying supporting members 12 which are herein shown as provided with the upper V-shaped flanges 13 for supporting angle irons or bars 20. These angle irons are preferably made of such form as to prevent the accumulation of dirt upon their upper surfaces and are herein shown as V-formed, having the apex of the V upward. These members are designed to form a support for the rolls of the conveyer belt and may be bent longitudinally to conform approximately to the shape in which the belt is held transversely.

As the bars 20 are bent so as to conform approximately to the trough shape of the conveyer, the standards 21 may be short members so that the bar 20 serves to firmly hold the rolls 22 in proper position. In order to more fully support these bars as well as to brace the side frame structure, I provide a pair of cross-bars 33 corresponding to each of the angle members 20. These cross-bars are situated at the sides of their respective angle members and are connected at their ends to the standards 10.

The bars 33 are straight and are arranged at such a height that at their central portion they occupy a horizontal height substantially the same as that of the bars 20, a connecting member 34 being employed at this point. This member as shown is substantially the shape of a W in cross-section and its side flanges are connected respectively to the bars 33, while its central portion approximately conforms to and is secured to the angle member 20, as is clearly shown in Fig. 3.

In the case of conveyers of this type, it is essential that the bearings of the several rolls shall be efficiently lubricated and protected against access of dirt. The form of supporting frame above described prevents the accumulation of dirt adjacent the bearings and in order to further insure this result, I provide a system of self feed lubrication which will operate to furnish fresh lubricant to the bearings so as to force out dirt from the bearings and operative for a long period of time without the attention of the operator.

As herein shown, each of the belt supporting rolls 22 is a wheel having an internal hub, comprising a tube or bushing 24 whereby each roll may be rotatably mounted on a tubular member 23 of smaller diameter, such members extending outwardly through openings in the wheel whereby they may be supported partially. Suitable bearings 25, between these bushings may be employed whereby each roll is rotatably mounted on the corresponding tube 23 which constitutes a stationary axle with a space between the tubes 23 and 24.

The tubes 23 are supported by means of brackets or standards 21, which are secured at their lower ends on the angle irons 20. These standards have transverse openings 26 through their upper ends shown as being enlarged at their ends to receive the ends of the tubular members 23 with a tight fit, the ends of the tubes 23 abutting the shoulder formed by the enlargement whereby a sealed connection is formed and a continuous passageway, extending axially through the center of the rolls 22, is provided.

The tubular members 23, are provided with suitable lateral openings 27, providing communication through this central passageway to the bearings and also to the space intermediate the members 23 and 24. In order to provide a continuous dirt free feed of lubricant I prefer to provide within this space, a member adapted to maintain pressure upon the lubricant and herein shown as consisting of a cup-shaped annular metal member 30 and having a spring 31 bearing against it. Such feed may be provided associated with any or all of the rolls as desired, though it is believed to be preferable to have it applied to the lower roll and to any of the others as desired. On the end standards 21, there may be provided suitable check valve connections 32 of standard form having communication to the central passageway and means for attaching a lubricant conduit whereby lubricant may be forced to the central passageway, and if desired, similar connections may be provided on each of the intermediate standards or uprights 21 as herein shown.

It will be apparent that when the lubricant is forced into the central passageway through any or all of these inlets, that the grease will force back the member or members 30 against the action of their springs and thereupon the springs will act to maintain pressure in the grease so as to insure its being fed to the several bearings. By this means, the proper feed of lubricant, to the bearings of the upper rolls as well as to those of the lower rolls will be insured. This construction obviates the difficulties which have been experienced in the past, of a failure to lubricate the bearings on the upper rolls.

While the rolls 22 may be of any improved type, the form shown, is one adapted for ready manufacture and in this form the rolls are made up of the two cylindrical halves held together in end abutment by means of the rods 28 which are inserted through the dished ends of the cylindrical members. Between these members the tube 24 may be inserted and the ends of the cylindrical members are preferably provided with cupped portions adapted to receive the ends of the tube.

In order to support the return run of the belt 40, suitable rolls 35 may be journaled in the standards 10 as shown.

It will be apparent that I have provided a means whereby the rollers are continuously lubricated without attention from the operator and are also protected against dirt and grit. The V-shaped angle bars will prevent any accumulation of dirt which might otherwise rise to a height sufficient to come into contact with the rollers and their bearings. It should be noted, however, that this angle bar construction is not claimed herein, but in my co-pending application No. 557,468 filed April 29, 1922.

Having described my invention, I claim:

1. In a conveyer support, a hollow axle, a wheel having an internal hollow hub, spaced from said axle, means to supply a lubricant to the space through the hollow axle, and means in said space to maintain lubricant therein under pressure.

2. In a conveyer support, a hollow axle, a wheel having a cylindrical inner hub spaced from said axle, bearings for said wheel mounted in said space, means to supply a lubricant to the space through the hollow axle, and means in said space for maintaining pressure on lubricant therein.

3. In a conveyer support, a hollow axle, a wheel having an internal tubular hub spaced from the axle, bearings for said wheel on the axle, there being an opening providing communication between the interior of said axle and the space between its exterior and the hub, means to supply a lubricant to the space through the hollow axle, and a spring surrounding the axle for maintaining pressure on lubricant in said space.

4. In a conveyer support, the combination of tubular means, rolls rotatably supported thereby at an angle to each other and with their axes lying in a substantially upright plane, means within a lower roll for forcing and maintaining lubricant in the upper portions of said tubular means, and means for supplying a lubricant to such lower roll.

5. In a conveyer support, tubular means, bearings surrounding said means, a roll rotatably mounted thereon, there being a space between said roll and means and a spring pressed member in said space for maintaining pressure on lubricant in said means, and means to afford communication between the tubular means, the space and the bearings, whereby lubricant is fed to said bearings by said spring pressed member.

6. In a conveyer support, communicating tubular means, bearings surrounding said means, rolls rotatably mounted thereon, there being a space between said rolls and means and a spring pressed member in the space between one of said rolls and tubular means, for maintaining pressure on lubricant in said means, there being communication between the passage in said tubular means and the space and between the passage and bearings, whereby lubricant is fed to said bearings by said spring pressed member.

7. In a device of the class described, means for holding a plurality of rolls, including tubular members and supporting brackets having passageways communicating with the tubular members, said tubular members having an interior passageway therethrough, rolls rotatably mounted on said tubular members by a pair of bearings spaced apart, causing a space between the bearings the rolls and said tubular members, and means whereby lubricant may be inserted into said space through brackets and the tubular members.

8. In a device of the class described, the combination with a pair of brackets, of a hollow axle carried thereby, means for the attachment of a grease conduit to feed grease under pressure into the interior of the axle, a hollow wheel surrounding the axle between the brackets, said wheel having a pair of ends and an internal sleeve extending from one end to the other, said sleeve being concentric with the axle and spaced a considerable distance from it, a pair of rolling bearings spaced apart and located around the axle and within the sleeve, there being a passageway from the hollow axle into the chamber between the bearings, and there being a closure surrounding the axle on the outer sides of each bearing whereby grease supplied under pressure to said chamber may pass to said bearings without escaping from the wheel.

9. In a conveyer support, a series of tubular members, rolls rotatably mounted on said tubular members, openings in said tubular members allowing communication with the bearings of the rolls whereby lubricant in said members may have access to the bearings of the rolls, standards having hollow ends for receiving the ends of the tubular members, whereby a continuous passageway is formed between the rolls, and spring means surrounding the tubular members for maintaining pressure on the lubricant in the passageways to feed it to said bearings.

10. In a device of the class described, the combination with a support of brackets carried thereby, tubular members carried by the brackets, rolls on the tubular members, brackets extending into the space between the adjacent rolls, means on the brackets in such space for supplying lubricant to the tubular members, said rolls having inside bearings and a lubricant space in communication with said tubular members.

11. In a device of the class described, the combination with a support of upwardly extending brackets carried thereby, hollow shafts carried by the brackets, rollers on said shafts between the brackets, each roller having within it an inner hub spaced from said hollow shaft and having bearings between said hub and shaft and having a lubricant space between the bearings and around the hollow shaft, there being a passageway from the hollow shaft into said space, and means carried between the rollers for enabling a supply of lubricant to be fed to them while they are in mounted condition.

12. In a conveyer support, the combination of a hollow axle, a bracket supporting the same, a wheel having an internal tubular hub surrounding said axle and spaced from it a pair of spaced bearings for said wheel on the axle and within the hub and wheel, an opening from the hollow axle into the space between the bearings, and means on the bracket for enabling lubricant to be forced into the lubricating space under pressure.

13. In a conveyer support, the combination of a hollow axle, a wheel having a cylindrical inner hub spaced from the axle, a pair of spaced bearings for said wheel on the axle and within the hub and wheel, an opening from the hollow axle into the space between the bearings, a bracket carrying the hollow shaft and having a passageway in communication with it, and means on the bracket for attachment of a device for supplying lubricant under pressure to said passageway, axle and wheel.

14. The combination with a support, of a hollow axle carried thereby and provided with means whereby grease may be forced into it, a wheel having an internal sleeve surrounding said axle some distance from it, a pair of rolling bearings within said sleeve around said axle and spaced apart to provide an annular grease chamber between the axle and sleeve and bearing, there being a passageway from the hollow shaft to said grease chamber.

15. In a device of the character described, the combination of a wheel support comprising a hollow axle, and means for attaching a lubricant conduit, whereby lubricant may be fed under pressure into the axle, a wheel having an internal sleeve surrounding and spaced from the axle, a pair of bearings within the sleeve adjacent the ends of the wheel providing a grease chamber between them, the hollow axle having a passageway communicating with such chamber, and closures at the opposite ends of the wheel surrounding the axle beyond the bearings.

16. In a device of the character described, the combination of a hollow axle, means whereby lubricant may be forced under pressure thereinto, a wheel having an internal sleeve surrounding the axle and spaced from it, a pair of rolling bearings surrounding the axle within the sleeve and spaced apart, there being a passageway from the interior of the axle into the chamber between the bearings, washers surrounding the axle adjacent the outer ends of the bearings.

In testimony whereof, I hereunto affix my signature.

WILLIAM E. PHILIPS.